United States Patent
Mueller et al.

(10) Patent No.: US 12,229,045 B1
(45) Date of Patent: Feb. 18, 2025

(54) BUFFERS IN SHARED MEMORY FOR SENSOR DATA IN VEHICLES

(71) Applicant: BlackBerry Limited, Waterloo (CA)

(72) Inventors: Michael Jonathan Mueller, Mississauga (CA); Noel Dylan Dillabough, Mississauga (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 18/473,628

(22) Filed: Sep. 25, 2023

(51) Int. Cl.
*G06F 12/02* (2006.01)

(52) U.S. Cl.
CPC .................. *G06F 12/023* (2013.01)

(58) Field of Classification Search
CPC .......... G06F 3/06; G06F 3/061; G06F 3/0602; G06F 3/0628; G06F 3/0668; G06F 3/0638; G06F 3/0646; G06F 3/0653; G06F 3/0655; G06F 3/0656; G06F 3/0658; G06F 3/0631; G06F 3/0637; G06F 3/0635; G06F 3/0644; G06F 3/0689; G06F 3/068; G06F 3/0679; G06F 3/0688; G06F 12/0223; G06F 12/023; G06F 12/0238; G06F 12/0615; G06F 12/0692; G06F 12/0806; G06F 12/0871; G06F 12/0868; G06F 12/10; G06F 12/1009; G06F 12/109; G06F 12/1081; G06F 12/0246–0284
See application file for complete search history.

(56) References Cited

U.S. PATENT DOCUMENTS

| | | | |
|---|---|---|---|
| 2017/0235614 A1* | 8/2017 | Choe ..................... | G06F 9/5044 718/104 |
| 2022/0137615 A1* | 5/2022 | Eperjesi ............... | G05D 1/0027 701/2 |
| 2022/0374366 A1* | 11/2022 | Meng .................. | G06F 12/0207 |

OTHER PUBLICATIONS

Wikipedia, Apache Thrift downloaded Sep. 4, 2023 (5 pages).
Andrew Prunicki, Apache Thrift, Jun. 2009 (20 pages).
Tutorials Point, Interprocess Communication with Sockets downloaded Sep. 4, 2023 (2 pages).

* cited by examiner

*Primary Examiner* — Khoa D Doan
(74) *Attorney, Agent, or Firm* — Trop Pruner & Hu, P.C.

(57) ABSTRACT

In some examples, a sensor service receives an indication of interest from a client for sensor data of a first sensor of the plurality of sensors, and allocates buffers in the memory for the plurality of sensors. The sensor service provides a first buffer to a sensor connector that is to receive the sensor data from the first sensor, and receives, from the sensor connector, an indication that the first buffer in the memory has been written with the sensor data from the first sensor. Based on the indication of interest from the client, the sensor service notifies the client that the first buffer is available for reading by the client from the memory.

19 Claims, 6 Drawing Sheets

BUFFERS IN SHARED MEMORY FOR SENSOR DATA IN VEHICLES

BACKGROUND

A vehicle can include various sensors to monitor conditions within the vehicle and/or conditions outside the vehicle. Sensor data from the sensors can be provided to clients. The clients can be located within the vehicle. Alternatively or additionally, the clients may be outside the vehicle.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Sensors can include hardware sensors and/or software sensors. Examples of sensors in a vehicle include sensors to monitor any or some combination of the following: an environmental condition, a speed of the vehicle, an acceleration of the vehicle, an orientation of the vehicle, an operational characteristic of a component within the vehicle, or other conditions. An example of a sensor to capture an environmental condition is a camera, which can capture video or image data of an environment within the vehicle or an environment outside the vehicle. Video or image data can be provided as frames from the camera. Another example of a sensor to capture an environmental condition is a microphone, which can capture audio data of an environment within the vehicle or an environment outside the vehicle.

Examples of further environmental conditions that can be monitored by sensors include a temperature (inside or outside the vehicle), a pressure (inside or outside the vehicle), an altitude of the vehicle, a condition of the road on which the vehicle is traveling, a traffic condition around the vehicle, or any other environmental conditions.

Examples of components that can be monitored by sensors include a brake of the vehicle, an engine of the vehicle, a tire of the vehicle, a transmission of the vehicle, a level of a battery of the vehicle, a position of a steering wheel, a condition of a safety system of the vehicle, whether or not a seat belt is being used, software in the vehicle, or any other components. Sensors can also monitor behaviors of a driver and/or occupants in the vehicle.

Although examples of sensors are given, it is noted that in further examples, a vehicle can include additional sensors or alternative sensors.

Sensor data can be consumed by clients, which can be located within the vehicle and/or outside the vehicle. A client can be a program or a hardware device. In some examples, a client can include a synthetic sensor, which is software that collects sensor data from one or more sensors. A client consumes sensor data by accessing the sensor data, or processing the sensor data to produce an output, or storing the sensor data.

If a vehicle includes a large number of sensors, or has sensors such as cameras that produce relatively large amounts of sensor data (e.g., image data or video data), the transport of sensor data from the sensors to clients may be associated with performance issues. For example, if a transport from the sensors of the vehicle to clients has limited bandwidth, then clients may experience delays in receiving the sensor data. As a result, the clients may not be able to process the sensor data in a timely manner to provide outputs based on the sensor data. Additionally, the transport of large amounts of sensor data can overburden resources of the vehicle, which can adversely affect other operations of the vehicle.

In accordance with some implementations of the present disclosure, a sensor service executing in the vehicle employs a shared memory model to distribute sensor data from sensors to clients. The shared memory model employs a shared memory including buffers to store sensor data accessible by the clients. A sensor connector receives sensor data from the sensors and writes the sensor data to buffers in the shared memory.

Using buffers of a shared memory to distribute sensor data of sensors with clients avoids transfers of large amounts of sensor data over transports associated with limited bandwidth. In some examples, an inter-process communication (IPC) interface of the Portable Operating System Interface (POSIX) includes various types of transports. A first type of transport of the POSIX IPC is a relatively slow socket-based transport. A second type of transport of the POSIX IPC includes a shared memory that enables faster communications than the socket-based transport. Although reference is made to POSIX in some examples, it is noted that other types of operating systems support shared memory and socket-based interfaces.

Figure 1:
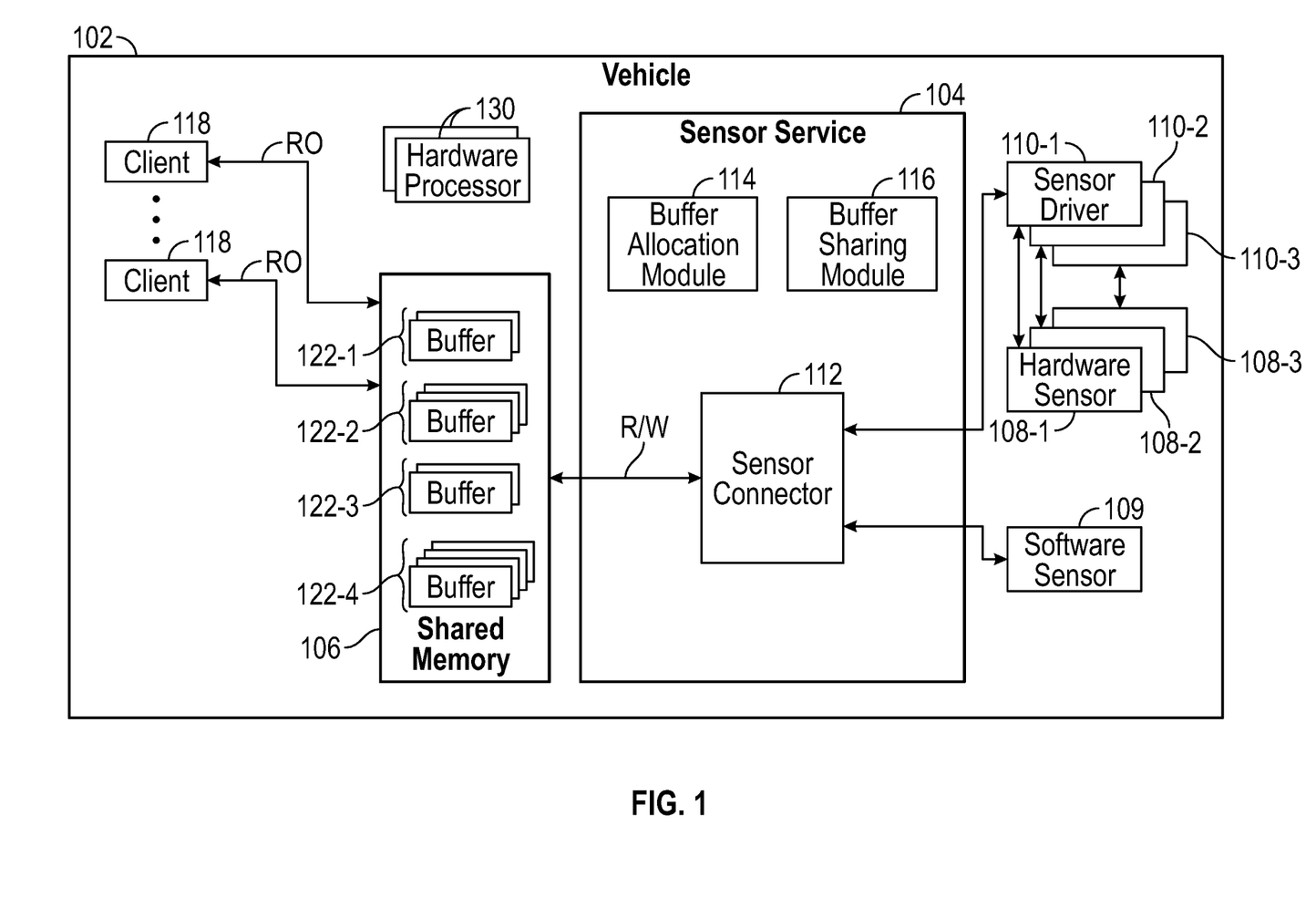
FIG. 1 is a block diagram of an example arrangement including a vehicle, according to some examples.

FIG. 1 shows an example arrangement that includes a vehicle 102 that has a sensor service 104 according to some examples of the present disclosure. The sensor service 104 is implemented using machine-readable instructions that are executable by one or more hardware processors 130 of the vehicle 102. A hardware processor can include a microprocessor, a core of a multi-core microprocessor, a microcontroller, a programmable integrated circuit, a programmable gate array, or another hardware processing circuit.

The sensor service 104 employs a shared memory 106, and more specifically, employs buffers allocated in the shared memory 106, to distribute sensor data provided by sensors of the vehicle 102 to various clients. The shared memory 106 can be implemented using one or more memory devices, such as dynamic random access memory (DRAM) devices, static random access memory (SRAM) devices, flash memory devices, disk-based storage devices, or other types of memory devices.

The vehicle 102 includes hardware sensors 108-1, 108-2, and 108-3. Although three hardware sensors are shown in FIG. 1, it is noted that the vehicle 102 can include a larger or smaller quantity of hardware sensors in other examples.

One or more of the hardware sensors 108-1, 108-2, and 108-3 can include cameras that produce image data or video data.

Sensor drivers 110-1, 110-2, and 110-3 are provided for the respective hardware sensors 108-1, 108-2, and 108-3. The sensor drivers 110-1 to 110-3 include machine-readable instructions executed in the vehicle 102. A sensor driver is a device driver for a hardware sensor that manages interaction with the hardware sensor. In some examples, the sensor drivers 110-1, 110-2, and 110-3 are part of an operating system (OS). In other examples, the sensor drivers 110-1, 110-2, and 110-3 are external of the OS.

The vehicle 102 can also include a software sensor 109. The software sensor 109 is implemented with machine-readable instructions executed in the vehicle 102. For example, the software sensor 109 can include an agent executing in a controller or another component of the vehicle 102. In other examples, there may be more than one software sensor in the vehicle 102.

In examples according to FIG. 1, the sensor service 104 includes a sensor connector 112 coupled to the sensor drivers 110-1 to 110-3 to receive sensor data from the hardware sensors 108-1 to 108-3. The sensor connector 112 is also coupled to the one or more software sensors 109 to receive sensor data from the one or more software sensors 109.

Although FIG. 1 depicts just one sensor connector 112, in other examples, there may be multiple sensor connectors in the sensor service 104. Each sensor connector of the multiple sensor connectors can interact with a respective collection of sensors in the vehicle 102. For example, a first sensor connector can receive sensor data of a first collection of sensors, a second sensor connector can receive sensor data of a second collection of sensors, and so forth.

The sensor service 104 further includes a buffer allocation module 114 and a buffer sharing module 116. The buffer allocation module 114 allocates (and possibly deallocates) buffers in the shared memory 106 for use in sharing sensor data with clients. The buffer sharing module 116 is to manage the sharing of the buffers by the sensor connector 112 and clients 118 to support the exchange of sensor data between the sensors and the clients. The clients 118 in the vehicle are able to access sensor data in buffers in the shared memory 106. Each client 118 can include an electronic component or a program.

In some examples, each of the sensor connector 112, buffer allocation module 114, and buffer sharing module refers to machine-readable instructions that are part of the sensor service 104. In other examples, one or more of the sensor connector 112, the buffer allocation module 114, and the buffer sharing module can be external of the sensor service 104.

In examples according to FIG. 1, the buffer allocation module 114 has allocated multiple sets of buffers for respective sensors. The buffer allocation module 114 has allocated a first set of buffers 122-1 to store sensor data for the hardware sensor 108-1, a second set of buffers 122-2 to store sensor data for the hardware sensor 108-2, a third set of buffers 122-3 to store sensor data for the hardware sensor 108-3, and a fourth set of buffers 122-4. A "set of sensors" can refer to a collection of one sensor or multiple sensors. Different sets of sensors may include the same quantity of sensors or different quantities of sensors.

The sensor connector 112 has read-write (R/W) access to a buffer in the shared memory 106. The read-write access allows the sensor connector 112 the right to read data from and write data to the buffer. A client (e.g., 118) has read-only (RO) access to a buffer in the shared memory 106. The client is able to read data from the buffer, but does not have any ability to write to the buffer.

As used here, a buffer in the shared memory 106 is "allocated" to a sensor if the buffer is designated for use in storing sensor data from the sensor (and not from another sensor so long as the buffer remains allocated to the sensor). In some examples, the buffer allocation module 114 may be able to deallocate a buffer so that the buffer is free for subsequent allocation to another sensor if warranted.

Buffer Sharing

Figure 2A:
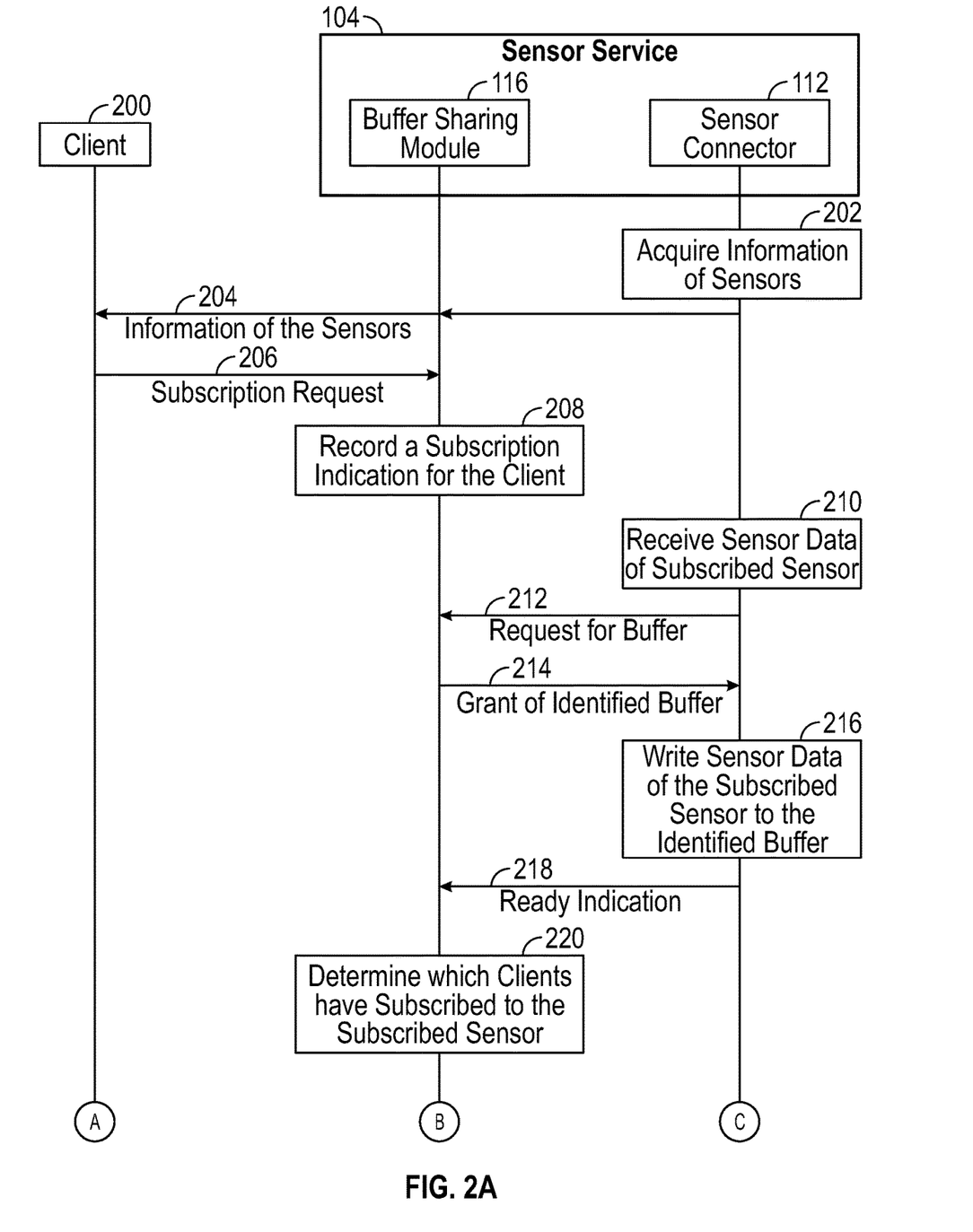
FIGS. 2A and 2B depict a flow diagram of a process of a sensor service and a client, according to some examples.
Figure 2B:
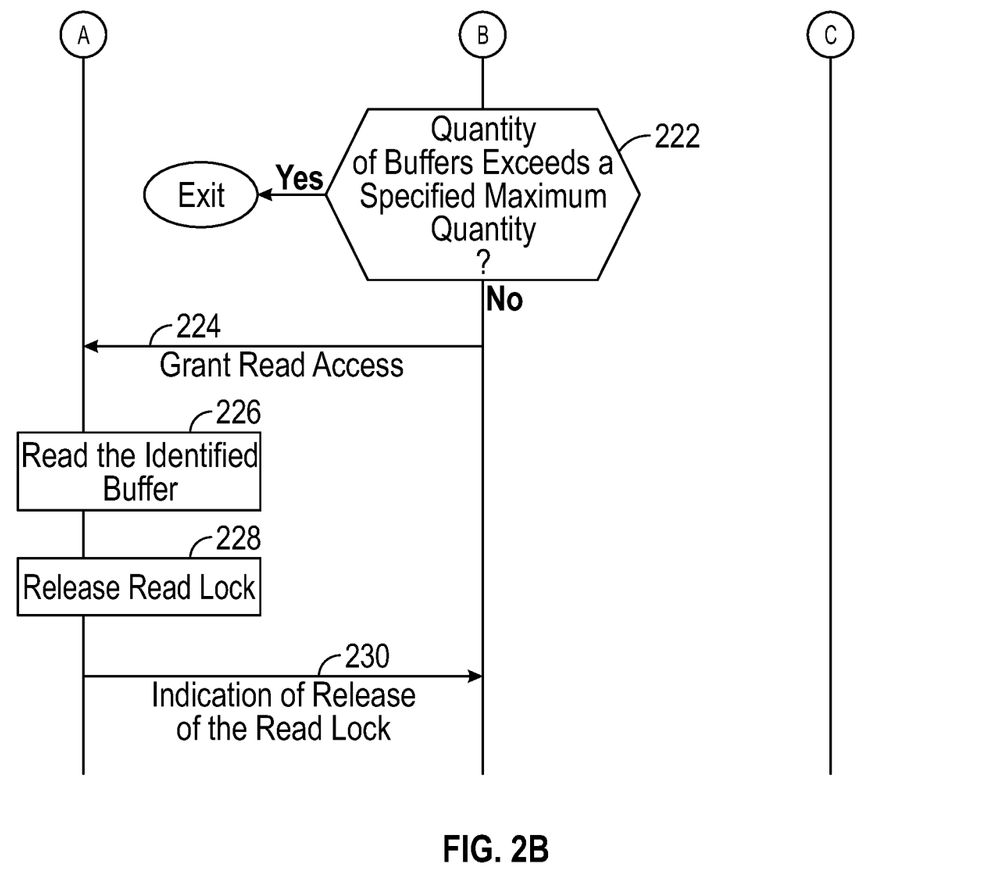

FIGS. 2A and 2B depict a flow diagram of a process performed by a client 200 and the sensor service 104 that includes the buffer sharing module 116 and the sensor connector 112, according to some examples. The client 200 can be a client 118 in FIG. 1.

The sensor connector 112 acquires (at 202) information of the sensors in the vehicle 102 that are associated with the sensor connector 112. Note that if there are multiple sensor connectors, each sensor connector may acquire information of its respective collection of sensors. In some examples, the sensor connector 112 can interact with sensor drivers 110-1 to 110-3 to obtain information of the hardware sensors 108-1 to 108-3 in the vehicle 102. The sensor connector 112 may also interact directly with the software sensor 109 to acquire information of the software sensor 109. The information of a sensor acquired by the sensor connector 112 can include a sensor identifier of the sensor, for example. Additionally, the information of the sensor may include size information that indicates an expected size of the sensor data from the sensor.

After acquiring information of the sensors associated with the sensor connector 112, the sensor service 104 presents (at 204) information of the sensors (including sensor identifiers) to the client 200. The sensor connector 112 may provide the information of the sensors to the buffer sharing module 116, which in turn provides the information of the sensors to the client 200. In some examples, the sensor service 104 may present a list of sensors (or more specifically, a list of sensor identifiers) to the client 200. The sensor service 104 may provide the list of sensors to the client 200 in response to a query from the client 200. Alternatively, the sensor service 104 may push the list of sensors to each client. The list of sensors may be communicated to a client over a socket-based transport (not shown), for example.

Alternatively, in another example, the list of sensors may be stored in the shared memory 106 for retrieval by the client 200. The client 200 can use the list of sensors to identify one or more sensors for which the client 200 desires to obtain sensor data.

The client 200 sends (at 206) a subscription request to the sensor service 104, where the subscription request identifies one or more sensors (e.g., one or more sensors identified in the list of sensors) of interest to the client 200. In response to the subscription request, the buffer sharing module 116 records (at 208) a subscription indication associated with the client 200 for sensor data of the identified one or more sensors. The subscription indication can be stored in a memory, such as the shared memory 106 or a different memory. The subscription indication can include information that identifies the client 200 and the one or more sensors of interest to the client 200. In some cases, the buffer sharing module 116 can send subscription information to the sensor connector 112 so that the sensor connector 112 knows which sensors are being subscribed to by clients.

When the sensor connector 112 receives (at 210) sensor data produced by a sensor ("subscribed sensor") to which the client 200 has subscribed, the sensor connector 112 issues (at 212) a request to the buffer sharing module 116 for a buffer for writing the sensor data of the subscribed sensor. The request for a buffer may include a sensor identifier of the subscribed sensor.

If a buffer for the subscribed sensor (having the sensor identifier) is available, the buffer sharing module 116 grants (at 214), to the sensor connector 112, the buffer for use by the sensor connector 112. This buffer is referred to as the "identified buffer." Note that if there is no buffer available for the subscribed sensor (e.g., all allocated buffers for the subscribed sensor have been used and are currently subject to read locks by clients), then the buffer sharing module 116 can reject the request for a buffer and the sensor connector 112 can drop the sensor data.

The grant of the identified buffer to the sensor connector 112 includes a reference to the identified buffer. The reference can include a pointer, a memory address, or any other type of reference. In some examples, modules of the sensor service 104 (including the buffer sharing module 116, the sensor connector 112, and the buffer allocation module 114) are within a common process space. As a result, all of the modules of the sensor service 104 can use the same reference (defined in the common process space) to refer to any given buffer.

The grant of the buffer to the sensor connector 112 provides an implicit read-write access of the identified buffer by the sensor connector 112. At this point, the sensor connector 112 is able to write (at 216) the sensor data of the subscribed sensor to the identified buffer. Note that in some cases, the buffer sharing module 116 may grant, to the sensor connector 112, multiple buffers for use in writing data of the subscribed sensor.

The sensor connector 112 sends (at 218), to the buffer sharing module 116, a ready indication that indicates that sensor data written to the identified buffer is accessible by the client 200. The ready indication can be responsive to any of various conditions, such as (1) the identified buffer has been filled with sensor data to a threshold level, or (2) the sensor connector 112 has finished writing to the identified buffer. More generally, the ready indication indicates that the identified buffer in the shared memory 106 has been written with the sensor data from the identified sensor.

The threshold level of the identified buffer can be any predefined level of the identified buffer, such as 100% filled, or filled to some other percentage (e.g., 99%, 95%, 90%, 80%, etc.) less than 100%. If the identified buffer is filled with sensor data of the subscribed sensor to the threshold level, the sensor connector 112 can issue the ready indication to the buffer sharing module 116.

Alternatively, the ready indication can be based on the sensor connector 112 determining that there is no further sensor data to write to the identified buffer (even though the identified buffer has not yet been filled to the threshold level).

The ready indication from the sensor connector 112 returns control of the identified buffer to the buffer sharing module 116, so that the buffer sharing module 116 is able to allow a client (e.g., the client 200) to access the identified buffer. The return of control to the buffer sharing module 116 implicitly releases the read-write lock acquired by the sensor connector 112 to write the sensor data of the subscribed sensor to the identified buffer.

In response to the ready indication, the buffer sharing module 116 determines (at 220) which clients have subscribed to the subscribed sensor. This determination is based on subscription indication(s) recorded by the buffer sharing module 116 in response to subscription requests from client(s). Since the buffer sharing module 116 has recorded the subscription indication for the client 200, the buffer sharing module 116 determines (at 222) whether a quantity of buffers granted to the client 200 for reading exceeds a specified maximum quantity.

The specified maximum quantity for any given client can be based on a configuration of the sensor service 104 or based on how many buffers are requested by the given client. For example, the sensor service 104 can store configuration information that specifies a configured maximum quantity of buffers to grant per client. Additionally, in some examples, a client can request that the sensor service 104 assign a lower maximum quantity of buffers to the client, which is lower than the configured maximum quantity according to the configuration information.

If the buffer sharing module 116 determines (at 222) that the quantity of buffers granted to the client 200 exceeds the specified maximum quantity, then no further read access is granted to the client 200, which means that the sensor data written to the identified buffer by the sensor connector 112 will not be made available to the client 200 at this time.

However, if the buffer sharing module 116 determines (at 222) that the quantity of buffers granted to the client 200 does not exceed the specified maximum quantity, the buffer sharing module 116 grants (at 224) read access of the identified buffer to the client 200. The grant of the read access can be part of a notification provided from the buffer sharing module 116 to the client 200 in response to the subscription request (sent at 206) from the client 200. The grant of the read access includes a grant of a read lock that allows the client 200 to read (at 226) the identified buffer. While the client 200 has the read lock on the identified buffer, the identified buffer cannot be used by the sensor connector 112 to write other sensor data. The read lock of the identified buffer being granted to the client 200 blocks write access of the identified buffer by the sensor connector 112.

Note, however, that it is possible for multiple clients to hold read locks on the same buffer. A read lock is thus a shared lock that can be shared by multiple clients.

In response to completion of the read access, the client 200 can release (at 228) the read lock. The buffer sharing module 116 receives (at 230) an indication of the release of the read lock.

By setting a specified maximum quantity of buffers to grant to each client (e.g., by restricting a quantity of read locks granted to the client based on a target lock quantity level), the sensor service 104 can restrict a portion of the shared memory 106 granted to the client at any time. If the client does not release read locks on buffers granted to the client (e.g., due to misbehavior or malfunctioning of the client), then the client will no longer receive notifications of further sensor data, resulting in such further sensor data being dropped. The specified maximum quantity of buffers per client prevents one client from over-consuming the shared memory 106, which may affect the ability of other clients in receiving sensor data. The specified maximum quantity of buffers may depend on how frequently the client accesses the sensor data. The client may have a higher maximum quantity of buffers if the client accesses the sensor data less often. In some cases, a maximum time duration may be specified so that if the client does not release a read lock within the maximum time duration, the buffer sharing module 116 can revoke the granted read access and release the read lock.

In some examples, the granting of a read access of the identified buffer can be accomplished using a buffer object that represents (a) a memory region in the shared memory 106 for the identified buffer, and (b) a read lock for the memory region. Different buffers in the shared memory 106 are represented by different buffer objects (or different instances of a buffer object). The buffer object may be made available to the client 200 using an application programming interface (API) of the sensor service 104, for example.

The buffer object contains a reference that is useable by the client 200 to access the memory region (that corresponds to the identified buffer). The buffer sharing module 116 grants the buffer object for the identified buffer to the client 200. The client 200 obtains the reference to the identified buffer from the buffer object that the client 200 holds. While the client 200 holds the buffer object, the client 200 has a read lock on the identified buffer.

When the client 200 completes its read access of the identified buffer, the client 200 can release the buffer object (or the instance of the buffer object) that was granted by the buffer sharing module 116 to the client 200. Releasing the buffer object is accomplished by the client 200 issuing a request (such as by a call to the API) of the sensor service 104, to release the buffer object. The client 200 releasing the buffer object also results in the client 200 releasing the read lock on the identified buffer.

In cases where multiple clients hold read locks (frame objects or instances of a frame object) on a given buffer, the buffer sharing module 116 is unable to reuse the given buffer if less than all of the multiple clients release the read locks (by releasing the frame objects or instances of the frame object representing the given buffer). Once all of the multiple clients have released their read locks on the given buffer, the buffer sharing module 116 can reuse the given buffer, such as by granting read-write access to the given buffer for writing of sensor data by the sensor connector 112.

Buffer Allocation

The buffer allocation module 114 can allocate buffers in the shared memory 106 on a per-sensor basis. The buffer allocation module 114 can adjust a quantity of buffers allocated to each sensor based on one or more criteria, as explained below.

Each sensor is allocated buffers, up to a maximum per-sensor quantity threshold for the sensor. Note that if there are multiple sensor connectors, each sensor connector is allocated up to a per-sensor connector maximum quantity of buffers for use with the sensors associated with the sensor connector.

Figure 3:
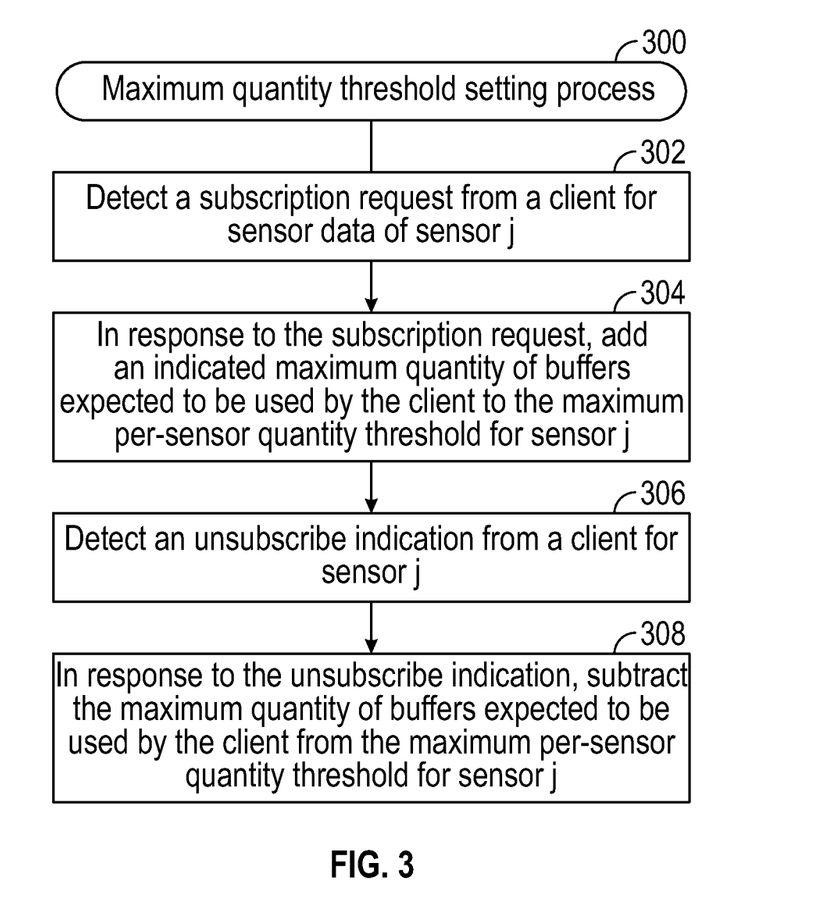
FIG. 3 is a flow diagram of a maximum quantity threshold setting process according to some examples.

FIG. 3 is a flow diagram of a maximum quantity threshold setting process 300 for a given sensor j (where "j" is an identifier of the given sensor). The maximum quantity threshold setting process 300 can be performed by the buffer allocation module 114 of the sensor service 104.

The buffer allocation module 114 detects (at 302) a subscription request from a client for sensor data of sensor j. The subscription request may include information indicating a maximum quantity of buffers expected to be used by the client. In response to the subscription request, the buffer allocation module 114 adds (at 304) the indicated maximum quantity of buffers expected to be used by the client to the maximum per-sensor quantity threshold for sensor j. Thus, if client A has indicated that client A expects to use M buffers for sensor j, and client B has indicated that client B expects to use N buffers for sensor j (where M and N are positive integers that may be the same or different from one another), then the buffer allocation module 114 sets the maximum per-sensor quantity threshold for sensor j to M+N (or a configured buffer quantity limit, whichever is less). More generally, as subscription requests from clients are detected by the buffer allocation module 114 for sensor data of sensor j, the buffer allocation module 114 sets the maximum per-sensor quantity threshold for sensor j as a sum of the indicated maximum quantities of buffers expected to be used by the clients, up to the configured buffer limit.

The buffer allocation module 114 can also detect (at 306) an unsubscribe indication from a client for sensor j. The unsubscribe indication can be in the form of an unsubscribe request to unsubscribe from sensor j (which indicates that the client is no longer interested in sensor data from sensor j). Alternatively, the unsubscribe indication is based on the client closing its connection to the sensor service 104, which indicates that the client is no longer interested in sensor data from any sensor.

In response to the unsubscribe indication, the buffer allocation module 114 subtracts (at 308) the maximum quantity of buffers expected to be used by the client from the maximum per-sensor quantity threshold for sensor j.

More generally, the maximum per-sensor quantity threshold for sensor j can be based on subscriptions of clients for sensor data of sensor j. The buffer allocation module 114 can adjust the maximum per-sensor quantity threshold for sensor j based on subscriptions from clients for sensor data of sensor j. The adjustment of the maximum per-sensor quantity threshold can be performed for each of multiple sensors in the vehicle 102.

In alternative examples, the maximum per-sensor quantity threshold for each sensor may be fixed (i.e., not varied).

Figure 4:
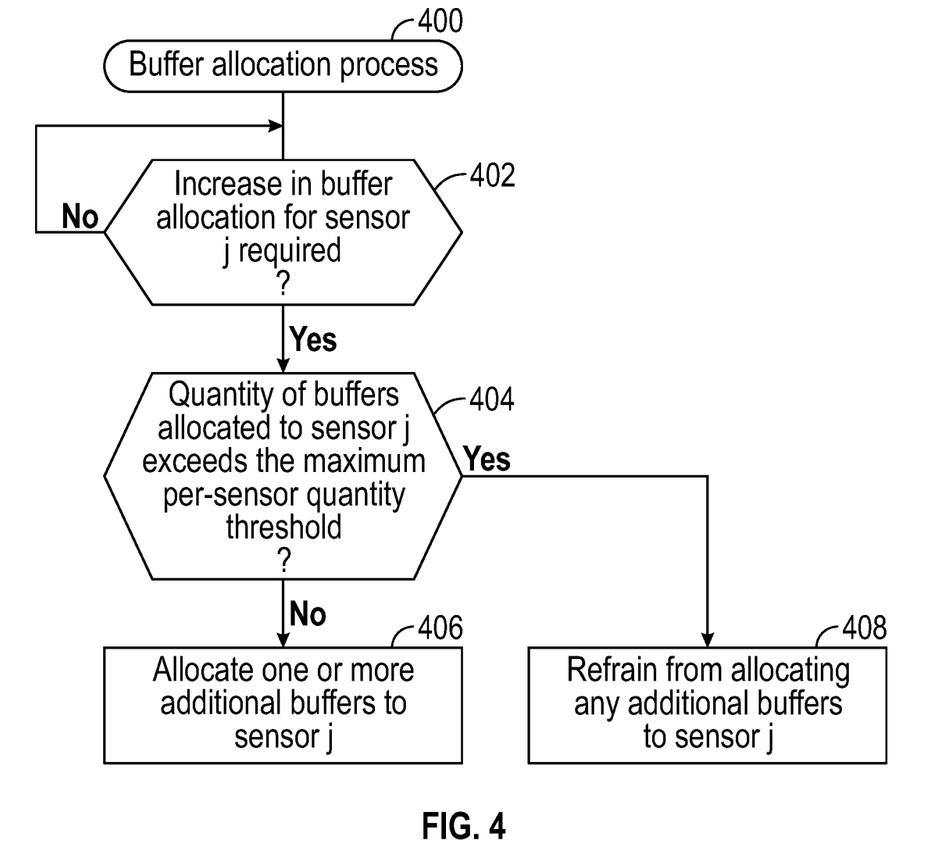
FIG. 4 is a flow diagram of a buffer allocation process according to some examples.

FIG. 4 is a flow diagram of a buffer allocation process 400 of the buffer allocation module 114 of the sensor service 104. The buffer allocation process 400 determines a quantity of buffers to allocate for each sensor.

For a given sensor j, the buffer allocation module 114 determines (at 402) whether an increase in buffer allocation for sensor j is required. This determination can be based on one of two scenarios: (1) the sensor service 104 has just started operation and no buffer has yet been allocated to sensor j, or (2) the allocated buffers for sensor j are all currently being used (e.g., read locks are placed on the buffers by clients). In response to determining (at 402) that an increase in buffer allocation for sensor j is required, the buffer allocation module 114 determines (at 404) if a quantity of buffers allocated to sensor j exceeds the maximum per-sensor quantity threshold for sensor j.

If the quantity of buffers allocated to sensor j does not exceed the maximum per-sensor quantity threshold for sensor j, the buffer allocation module 114 allocates (at 406) one or more additional buffers to sensor j, provided the allocation of the additional buffer(s) does not exceed the maximum per-sensor quantity threshold for sensor j.

If the quantity of buffers allocated to sensor j exceeds the maximum per-sensor quantity threshold for sensor j, the buffer allocation module 114 refrains (at 408) from allocating any additional buffers to sensor j.

Figure 5:
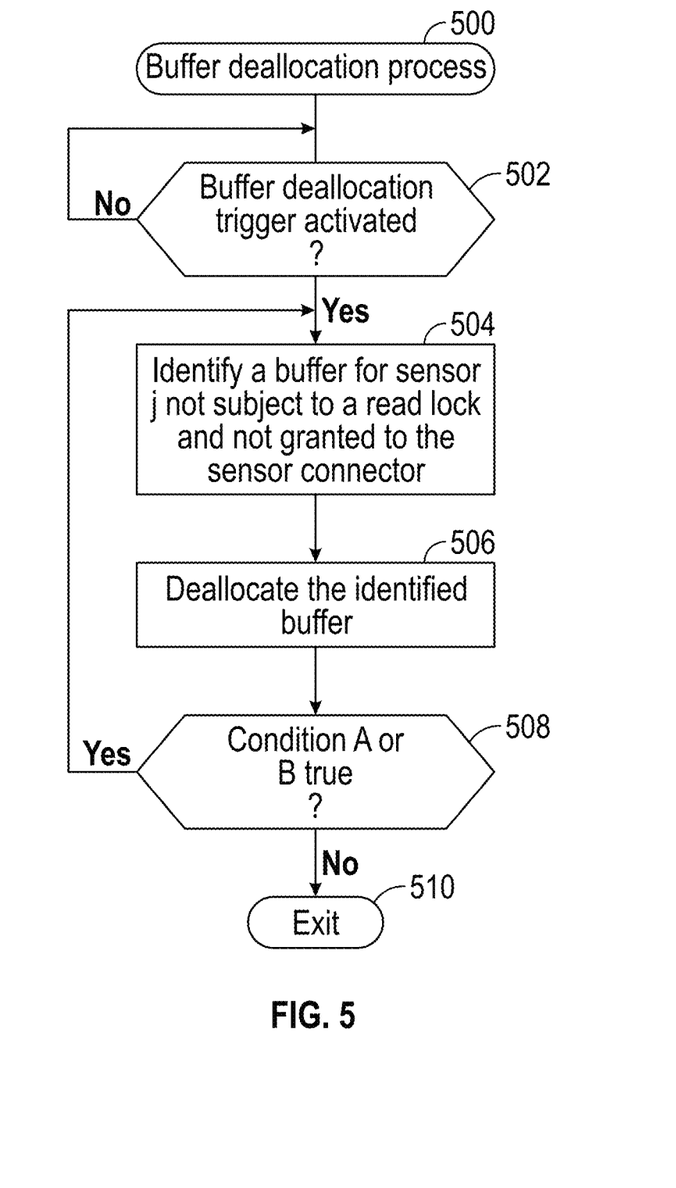
FIG. 5 is a flow diagram of a buffer deallocation process according to some examples.

FIG. 5 is a flow diagram of a buffer deallocation process 500 of the buffer allocation module 114. The buffer allocation module 114 determines (at 502) if a buffer deallocation is to be triggered for sensor j.

A first trigger for buffer deallocation is based on a client providing an unsubscribe indication, either with an unsubscribe request for sensor j or by closing the client's connection to the sensor service 104. Based on the unsubscribe indication, the buffer allocation module 114 may decrease the maximum per-sensor quantity threshold for sensor j ("new maximum per-sensor quantity threshold"), as explained above with FIG. 3. The first trigger is activated if the quantity of buffers allocated for sensor j exceeds the new maximum per-sensor quantity threshold for sensor j.

A second trigger for buffer deallocation is based on read locks on a buffer for sensor j being released. The second trigger is activated if the quantity of unused (unlocked) buffers exceeds a specified unused buffers threshold.

In response to activation of either the first trigger or the second trigger (which follows the YES branch of the decision diamond 502), the buffer allocation module 114 identifies (at 504) a buffer for sensor j that is not subject to a read lock and that has not been granted to the sensor connector 112 for writing. The buffer allocation module 114 deallocates (at 506) the identified buffer.

The buffer allocation module 114 determines (at 508) whether condition A or condition B is true. Condition A is true if the allocated quantity of buffers for sensor j exceeds the maximum per-sensor quantity threshold for sensor j. Condition A is false if the allocated quantity of buffers for sensor j does not exceed the maximum per-sensor quantity threshold for sensor j.

Condition B is true if a quantity of unused buffers for sensor j exceeds the specified unused buffers threshold. Condition B is false if the quantity of unused buffers for sensor j does not exceed the specified unused buffers threshold.

If either Condition A or Condition B is true, the buffer allocation module 114 re-iterates tasks 504 and 506 to deallocate another buffer for sensor j. If both Condition A and Condition B are false, the buffer allocation module 114 exits (at 510) and does not perform any further buffer deallocation for sensor j.

In alternative examples, instead of dynamically allocating and deallocating buffers for each sensor according to the buffer allocation process 400 of FIG. 4 and the buffer deallocation process 500 of FIG. 5, the buffer allocation module 114 can perform a fixed allocation of buffers for each sensor upon startup of the sensor service 104.

A storage medium to store machine-readable instructions can include any or some combination of the following: a semiconductor memory device such as a DRAM or SRAM, an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A vehicle comprising:
    at least one processor;
    a plurality of sensors;
    a memory;
    a sensor service executable by the at least one processor to:
    receive an indication of interest from a client for sensor data of a first sensor of the plurality of sensors,
    allocate buffers in the memory for the plurality of sensors,
    provide a first buffer of the buffers to a sensor connector that is to receive the sensor data from the first sensor,
    receive, from the sensor connector, an indication that the first buffer in the memory has been written with the sensor data from the first sensor,
    based on the indication of interest from the client, notify the client that the first buffer is available for reading by the client from the memory, and
    grant a read lock to the client for read access of the first buffer in the memory.

2. The vehicle of claim 1, wherein the read lock of the first buffer being granted to the client blocks write access of the first buffer by the sensor connector.

3. The vehicle of claim 2, wherein the sensor service is executable by the at least one processor to:
    determine whether all read locks on the first buffer have been released, and
    based on a determination that all read locks on the first buffer have been released, allow reuse of the first buffer.

4. The vehicle of claim 3, wherein the sensor service is executable by the at least one processor to:
    grant multiple read locks to a plurality of clients for read access of the first buffer,
    wherein the determination that all read locks on the first buffer have been released comprises a determination that the plurality of clients have released the multiple read locks.

5. The vehicle of claim 1, wherein the sensor service is executable by the at least one processor to:
    obtain, from the sensor connector, information of the plurality of sensors.

6. The vehicle of claim 5, wherein the information of the plurality of sensors from the sensor connector comprises identifiers of the plurality of sensors.

7. The vehicle of claim 1, wherein the sensor service is executable by the at least one processor to:
    determine a quantity of buffers to allocate to the first sensor based on subscriptions for the first sensor from clients.

8. The vehicle of claim 7, wherein the sensor service is executable by the at least one processor to deallocate a buffer for the first sensor based on an unsubscribe indication from a client or based on a quantity of unused buffers for the first sensor exceeding a threshold.

9. The vehicle of claim 1, wherein the indication of interest comprises a subscription request from the client.

10. The vehicle of claim 1, wherein the client comprises a synthetic sensor.

11. The vehicle of claim 1, wherein the sensor connector is a first sensor connector of a plurality of sensor connectors that are to receive sensor data from different respective sets of sensors.

12. The vehicle of claim 1, wherein the client is a first client of a plurality of clients, and the sensor service is executable by the at least one processor to:
restrict a quantity of read locks granted to the first client based on a target lock quantity level.

13. The vehicle of claim 1, wherein the sensor service and the sensor connector are within a common process space.

14. The vehicle of claim 13, wherein the sensor service and the sensor connector are to use a respective reference, in the common process space, to refer to each buffer of the buffers.

15. The vehicle of claim 1, wherein the notification to the client that the first buffer is available to read by the client from the memory comprises information useable by the client to access the first buffer, the information comprising information of a region of the memory where the first buffer is stored, and the read lock for the first buffer.

16. The vehicle of claim 1, wherein the sensor service is executable by the at least one processor to:
adjust a quantity of buffers allocated to each sensor of the plurality of sensors based on one or more criteria.

17. A non-transitory machine-readable storage medium comprising instructions that upon execution cause a system to:
receive a subscription from a client for sensor data of a first sensor of a plurality of sensors in a vehicle;
allocate buffers in a shared memory of the vehicle for the plurality of sensors,
provide write access of a first buffer of the buffers to a sensor connector that is to receive the sensor data from the first sensor;
receive, from the sensor connector, an indication that the first buffer in the shared memory has been written with the sensor data from the first sensor; and
based on the subscription from the client and the indication, grant a read lock to the client for read access of the first buffer by the client.

18. The non-transitory machine-readable storage medium of claim 17, wherein the granting of the read access of the first buffer by the client is based on a determination that a quantity of buffers granted to the client does not exceed a maximum quantity.

19. A method comprising:
allocating, by a sensor service executed on at least one processor in a vehicle, a respective set of buffers for each sensor of a plurality of sensors in the vehicle;
receiving, by the sensor service, a subscription from a client for sensor data of a first sensor of the plurality of sensors;
providing write access of a first buffer of a first set of buffers in a memory to a sensor connector that is to receive the sensor data from the first sensor, the first set of buffers allocated to the first sensor;
receiving, by the sensor service from the sensor connector, an indication that the first buffer in the memory has been written with the sensor data from the first sensor; and
based on the subscription from the client and the indication, granting, by the sensor service, a shared read lock of the first buffer to the client.

* * * * *